Figure 3C:
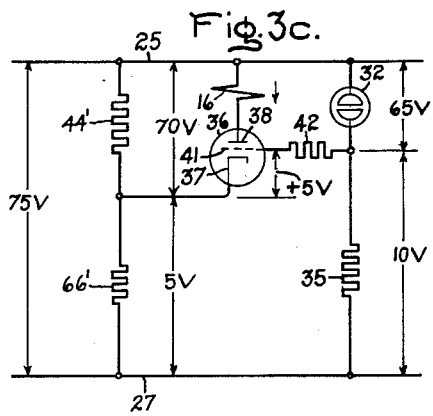

Oct. 28, 1952     M. A. EDWARDS ET AL     2,616,072
EXCITATION SYSTEM
Filed Sept. 13, 1949     2 SHEETS—SHEET 1
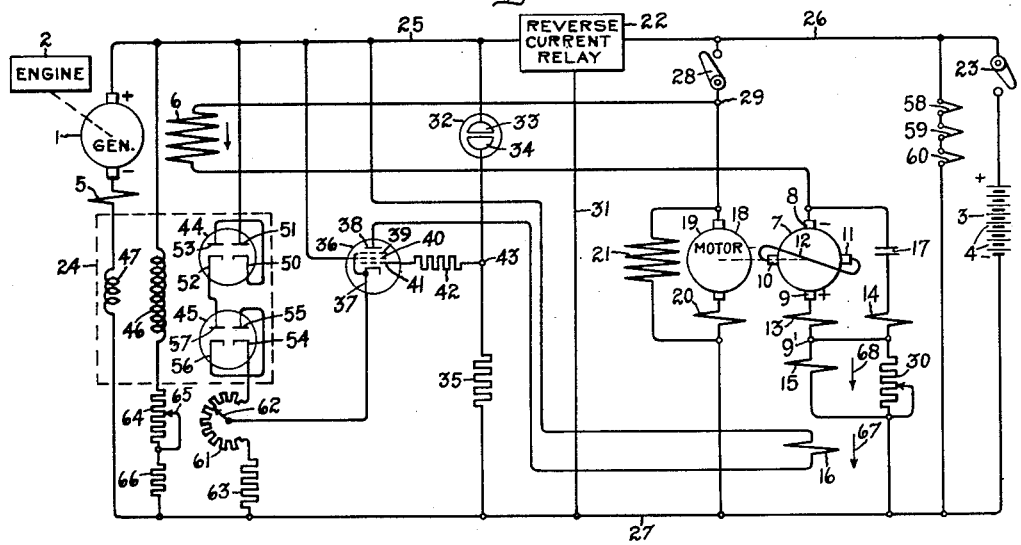
Inventors:
Martin A. Edwards,
Donald E. Garr,
Hugh M. Ogle,
by Ernest C. Britton
Their Attorney.

Oct. 28, 1952　　　M. A. EDWARDS ET AL　　　2,616,072
EXCITATION SYSTEM
Filed Sept. 13, 1949　　　　　　　　　　　　　2 SHEETS—SHEET 2

Inventors:
Martin A. Edwards,
Donald E. Garr,
Hugh M. Ogle,
by Ernest F. Britton
Their Attorney.

Patented Oct. 28, 1952

2,616,072

UNITED STATES PATENT OFFICE 2,616,072

EXCITATION SYSTEM

Martin A. Edwards, Scotia, and Donald E. Garr and Hugh M. Ogle, Schenectady, N. Y., assignors to General Electric Company, a corporation of New York Application September 13, 1949, Serial No. 115,426

2 Claims. (Cl. 322—25)

Our invention relates to excitation systems for dynamoelectric machines and more particularly to the use of such systems in connection with the charging of storage batteries.

In the charging of storage batteries by the use of a dynamoelectric machine as a charging generator it is frequently desirable to maintain a constant charging voltage across a battery under various conditions of battery loading or state of charge. It is further generally desirable to limit the magnitude of the current supplied by such a charging generator to a safe value relative to the design thereof. In the case of a relatively large generator, the excitation therefor is frequently supplied by the use of an auxiliary dynamoelectric machine, such as an amplidyne generator, as an exciter, and control of the characteristics of the charging generator is effected by control of the excitation supplied to the exciting generator. Accordingly to regulate the output voltage of a charging generator in such a system a voltage regulating arrangement responsive to the generated voltage is employed to control excitation supplied to the exciter generator. Similarly, to limit the current output of the charging generator a current-limiting arrangement is employed to control excitation supplied to the exciting generator.

It is an object of our invention to provide a new and improved excitation system for dynamoelectric machines which is particularly useful in charging storage batteries but not limited to this particular application.

It is another object of our invention to provide a new and improved current-limiting arrangement in an excitation system for dynamoelectric machines.

It is a further object of our invention to provide in an excitation system for dynamoelectric machines a current-limiting arrangement having a relatively small voltage drop thereacross and a relatively sharp cut-in point, the latter being easily adjustable over a substantial range of values.

Broadly speaking, our invention provides an excitation system for a main dynamoelectric machine or generator which is arranged to be excited by an auxiliary dynamoelectric machine or exciter. A regulating circuit is arranged to maintain the voltage output of the main generator constant regardless of load thereon, within limitations in the current capacity of the generator. Beyond a predetermined current use is made of a magnetron device in a current-limiting arrangement to reduce the generator voltage output to reduce correspondingly the generator current output.

Figure 4:
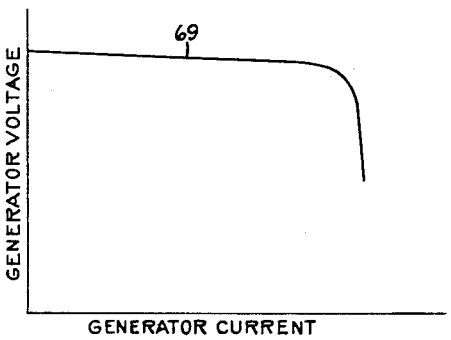
Figure 5:
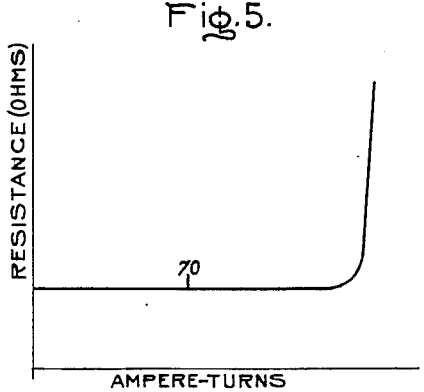

Our invention will be better understood from the following description taken in connection with the figures of the accompanying drawing, in which Fig. 1 represents diagrammatically a battery charging arrangement employing an excitation system embodying certain features of our invention; Fig. 2 is a cross-sectional view of a magnetron device; Figs. 3a, 3b, 3c are simplified diagrams of a portion of Fig. 1 in which certain assumed circuit conditions are shown; and Figs. 4 and 5 are curves representing certain characteristics of the arrangement of Fig. 1.

Referring now to Fig. 1, there is shown a battery charging system in which a dynamoelectric machine 1 is arranged to be driven by an engine 2 such as a diesel engine, and to supply charging current to a storage battery 3 which is represented as including a plurality of individual cells 4. The system shown may conveniently be employed in connection with diesel-electric locomotives and the like wherein storage batteries may be required for starting and other purposes. In such an arrangement engine 2 may be a relatively large main engine employed to provide motive power for the locomotive and may be operated over a relatively wide range of speeds. Generator 1 may be belted or otherwise suitably connected to engine 2 and is preferably employed solely for the purpose of charging storage battery 3.

Generator 1 is provided with a series field exciting winding 5 and a shunt field exciting winding 6. Winding 5 is connected to one of the armature terminals of generator 1 and is arranged to conduct the generator armature current thus providing a portion of the excitation for generator 1. The principal portion of such excitation however is supplied through winding 6 by an auxiliary dynamoelectric machine 7 which is employed as an exciter. Exciter 7 is preferably an amplidyne generator of the type described and claimed in U. S. Pat. No. 2,227,992 of Alexanderson et al., assigned to the same assignee as the present invention. Amplidyne 7 is provided with a pair of main armature terminals 8 and 9, a pair of quadrature terminals 10 and 11 short-circuited by a conductor 12, and a plurality of field exciting windings 13, 14, 15 and 16.

Field exciting winding 13 is employed as a compensating winding for amplidyne 7. One terminal of winding 13 is connected to armature terminal 9 and in effect the other terminal of winding 13, rather than terminal 9, actually constitutes one output terminal of amplidyne 7, and is designated in the drawing by numeral 9'. Field exciting winding 14 is employed as an anti-hunt winding. One terminal of winding 14 is connected to armature terminal 9' and the other terminal of winding 14 is connected to an anti-hunt capacitance 17, which in turn is connected to armature terminal 8, thus connecting the series combination of winding 14 and capacitance 17 across output terminals 8 and 9 of amplidyne 7. The function of winding 14 is to provide an anti-hunt effect in the regulating system to be described hereinafter.

Exciter 7 is arranged to be driven by a motor 18 having an armature 19, a field exciting winding 20 connected in series with armature 19, and a second field exciting winding 21 connected in shunt relation across the series combination of armature 19 and winding 20.

Attention is next directed to the connections between generator 1 and battery 3. In particular the positive output terminal of generator 1 is connected through the series windings of a conventional reverse current relay 22 to a switch 23 and thence to the positive terminal of battery 3. The negative terminal of generator 1 is connected through series field exciting winding 5 and the series winding of a magnetron device 24, which will be described in greater detail hereinafter, to the negative terminal of battery 3. Thus, a pair of buses of opposite polarity are established between generator 1 and battery 3. The portion of the positive bus between generator 1 and relay 22 is designated in the drawing by numeral 25 and the portion between relay 22 and switch 23 by numeral 26. The portion of the negative bus between magnetron 24 and battery 3 is designated by numeral 27.

Motor 18 is connected in series with a switch 28 between buses 26 and 27, the junction point between motor 18 and switch 28 being designated by numeral 29. Generator field exciting winding 6 is connected to junction point 29 and to output terminal 8 of exciter 7. Field exciting winding 15 of exciter 7 is connected to output terminal 9' thereof and to bus 27. An adjustable resistance 30 is connected in parallel relation with winding 15 to act as a variable shunt to control the exciting strength of winding 15. From the foregoing description it will be seen that when switch 28 is closed, motor 28 is effectively connected between buses 26 and 27, and similarly the series combination of winding 6 and exciter 7 is connected between buses 26 and 27.

It will be helpful in the understanding of our invention to describe briefly the operation of the battery charging system thus far described before proceeding with the description of the voltage regulating and current limiting features of the arrangement. If it is assumed that switches 23 and 28 are open and that engine 2 is driving generator 3 at a substantially constant speed, then battery 13 is disconnected from bus 26 and substantially zero voltage is generated by generator 1 since no excitation is provided therefor. Accordingly no potential difference exists between buses 25 and 27 or between buses 26 and 27.

If switch 23 is closed the voltage of battery 3 is transferred to buses 26 and 27 and since no voltage is generated by generator 1 there is a tendency for battery 3 to circulate a current through generator 1. However due to the action of reverse current relay 22 the connection between buses 25 and 26 is interrupted. Therefore, the voltage of battery 3 exists between buses 26 and 27, but no voltage exists between buses 25 and 27.

If switch 28 is closed the voltage of battery 3 is impressed on motor 18 causing rotation of motor 18 and exciter 7, which is driven thereby. The voltage of battery 3 is likewise impressed on the series combination of field exciting winding 6, exciter 7 and field exciting winding 15 causing a current to flow therethrough. The flow of current through winding 6 causes excitation to be provided for generator 1 causing a voltage to be generated thereby and to be applied between buses 25 and 27.

The flow of current through winding 15 likewise causes excitation to be provided for exciter 7 and causes a voltage to be generated thereby across output terminals 8 and 9'. The polarity of the voltage generated by exciter 7 due to excitation by winding 15 is such that the potential of terminal 9' is positive with respect to the potential of terminal 8 and in effect the voltage generated by exciter 7 is caused to act in series with the voltage of battery 3 between buses 26 and 27, thereby providing the sum of these voltages to be employed in circulating an exciting current through field exciting winding 6. By use of the arrangement shown a substantial portion of the excitation of winding 6 is obtained from the voltage between buses 26 and 27, thereby reducing the power requirements of exciter 7. This is particularly the case since the speed of generator 1 may vary over a considerable speed range, with an accompanying variation in the excitation requirements thereof.

With the establishment of a voltage of sufficient magnitude by generator 1 across buses 25 and 27 action of reverse current relay 22, which is provided with a shunt connection 31 to bus 27, is effected in a conventional manner to complete the connection between buses 25 and 26. Once the connection between buses 25 and 26 is completed the effect of relay 22 may be ignored in the operation of the battery charging system. It will be understood that reverse current relay 22 per se does not constitute a part of our invention.

Without suitable regulation, the magnitude of current circulated through winding 6 is unregulated and suitable characteristics of generator 1 are not obtained for charging battery 3. To regulate the magnitude of the voltage of generator 1 by controlling the excitation thereof, use is made of field exciting winding 16 and an associated regulating circuit to control the excitation and output voltage of exciter 7. A gaseous electron discharge device 32, such as a neon tube, having a pair of electrodes 33 and 34, is employed as a reference voltage device. Electrode 33 is connected to bus 25 and electrode 34 is connected through a current limiting resistance 35 to bus 27. As is well known, when a gaseous discharge device is caused to break down and conduct current from one electrode to the other, the voltage drop through the gaseous discharge between the electrodes is substantially constant over a considerable range of conducted current. Thus for a considerable variation in voltage between buses 25 and 27 the voltage drop between electrodes 33 and 34 is substantially constant and may be conveniently employed as a voltage reference.

An electron discharge device 36 is employed to make use of the reference voltage provided by gaseous discharge device 32. Electron discharge device 36 is preferably of the beam-power pentode type having a cathode 37, an anode 38, a suppressor electrode 39, a screen electrode 40, and a control electrode 41, the latter being employed to control the flow of current from anode 38 to cathode 37. Anode 38 is connected to bus 25 through field exciting winding 16 of exciter 7. Suppressor 39 is connected to cathode 37 and screen 40 is connected to bus 25. Control electrode 41 is connected in series relation with current limiting resistance 42 to the junction point, designated by numeral 43, between electrode 34 and resistance 35.

Magnetron 24, which is employed in connection with electron discharge device 36, comprises a pair of electron discharge devices 44 and 45, a potential winding 46, and a current winding 47. A physical structure which may conveniently be employed for magnetron 24 is shown in Fig. 2, wherein it will be seen that electron discharge devices 44 and 45 are co-axially positioned at the approximate axial center of a cylindrical field exciting coil 48 made up of windings 46 and 47. Coil 48 is preferably surrounded by a cylindrical shell 49 of a magnetic material such as iron.

It is well known that electrons flowing from a cathode to an anode in an electron discharge device may be deflected from their normal paths by action of a magnetic field and it is upon such action that the operation of a magnetron is based. Thus it will be seen in the arrangement shown in Fig. 2 that a magnetic field created by flow of current through windings 46 and 47 may be made to act upon electrons flowing in electron discharge devices 44 and 45. The manner in which use is made of magnetron 24 as a current limiting device will be more fully described hereinafter.

Referring again to Fig. 1, each of electron discharge devices 44 and 45 comprises a pair of diode sections. One diode section of discharge device 44 comprises a cathode 50 and an anode 51, while the other diode section comprises a cathode 52 and an anode 53. Similarly, the diode sections of discharge device 45 comprise a cathode 54 and an anode 55, and a cathode 56 and an anode 57, respectively.

Electron discharge devices 36, 44 and 45 have, in addition to the elements previously mentioned, cathode-heating elements 58, 59, and 60, respectively, which for the sake of clarity are shown in Fig 1 in relation to the circuit connections thereto. In particular heating elements 58—60 may be conveniently connected in series relationship between buses 26 and 27 so that energy is supplied to the heating elements whenever buses 26 and 27 are energized by closing switch 23. In this manner the cathode elements of electron discharge devices 36, 44 and 45 are heated, the devices thereby being rendered operative whenever voltage exists between buses 26 and 27 and regardless of whether voltage exists between buses 25 and 27.

The diode sections of electron discharge devices 44 and 45 are connected in series relation. Anode 51 is connected to bus 25, cathode 50 is connected to anode 53, cathode 52 is connected to anode 57, and cathode 56 is connected to anode 55. Cathode 54 is connected to one terminal of a rheostat 61 having a movable tap 62, and the other terminal of rheostat 61 is connected to a fixed resistance 63, which in turn is connected to bus 27. Cathode 37 of electron discharge device 36 is connected to movable tap 62 of rheostat 61.

One terminal of potential winding 46 of magnetron 24 is connected to bus 25. The other terminal of winding 46 is connected to an adjustable resistance 64 having a movable tap 65. Resistance 64 is connected to a fixed resistance 66 which is also connected to bus 27. Winding 47 is connected in series with generator 1 and is arranged to conduct the current supplied thereby.

In the foregoing description mention has already been made of the manner in which charging generator 1 is caused to generate a voltage which, without a regulating action, is uncontrolled and hence is unsuitable for use in charging storage battery 3. The regulation of the voltage of generator 1 or the voltage between buses 25 and 27 which is substantially the same as the voltage of generator 1, is effected by control of current flow through field exciting winding 16 through action of electron discharge device 36.

For the purpose of charging storage battery 3 it is desirable to maintain this voltage at a substantially constant value. A reference voltage is obtained by the use of gaseous discharge device 32 in which a voltage of substantially constant magnitude is established between electrodes 33 and 34. By connecting control electrode 41 of electron discharge device 36 to electrode 34 at junction 43, the potential of control electrode 41 is maintained substantially constant with respect to the potential of bus 25.

The diode elements of electron discharge devices 44 and 45 are operated in such a manner that the series combination of the four diode elements behaves as a resistance element. Thus the series combination of electron discharge devices 44 and 45, rheostat 61, and resistance 63, connected between buses 25 and 27, constitutes in effect a voltage divider. Since cathode 37 of electron discharge device 36 is connected to movable tap 62, of rheostat 61, the potential of cathode 37 is adjustable with respect to the potential of bus 25. Since the potential of anode 38 is positive with respect to the potential of cathode 37 a current tends to flow from anode 38 to cathode 37 the magnitude of such current depending upon the potential of control electrode 41 with respect to cathode 37.

The current flowing through electron discharge device 36 also flows through field exciting winding 16, the direction of such flow being indicated by an arrow 67. The direction of flow of current through winding 16 is such that the excitation provided thereby for exciter 7 opposes the excitation provided by winding 15, the flow of current through winding 15 being indicated by an arrow 68. In other words, an increase of current flowing through winding 16 tends to cause the total excitation provided for exciter 7 and the voltage generated thereby to be decreased.

The regulating action which is obtained through the use of electron discharge device 36 may best be understood by a consideration of certain assumed conditions. If it is assumed that the generated voltage between buses 25 and 27 tends to decrease, the potential of cathode 37 with respect to bus 25 tends to decrease, while the potential of control electrode 41 tends to remain constant, and, therefore, the potential of cathode 37 becomes more positive with respect to potential of control electrode 41. Thus the current conducted by electron discharge device 36 and field exciting winding 16 tends to decrease, causing an increase in the net excitation of exciter 7 and an accompanying increase in the voltage generated thereby. The increase in the voltage of exciter 1 tends to increase the current through field exciting winding 6 of generator 1.

Thus for the assumed decrease of voltage of generator 1 an increase in excitation therefor and an accompanying increase in voltage generated thereby are provided by the regulating action described. The value of regulated voltage may be conveniently adjusted by varying the setting of adjustable tap 62 of rheostat 61 thereby varying the potential of cathode 37 with respect to the potential of control electrode 41.

To aid further in understanding the regulating action described it will be helpful to consider examples containing specific values of voltage in the regulating circuit. The examples described hereinafter are shown in connection with simplified schematic diagrams in Figs. 3a, 3b, and 3c. The same numerals are used in Fig. 3 as in Fig. 1 for equivalent elements, except that the series combination of the diodes of electron discharge devices 44 and 45 are represented in Fig. 3 by a single resistance element having numeral 44', and resistances 61 and 63 by a single resistance element having numeral 66'. Referring to Fig. 3a, if it is assumed that the normal voltage of storage battery 3 is approximately 75 volts which is a voltage commonly employed in diesel-electric locomotives, then a voltage of approximately 80 volts may be required for charging purposes between buses 25 and 27. A voltage of approximately 65 volts may conveniently be maintained across gaseous discharge device 32 causing control electrode 41 to be 65 volts negative with respect to bus 25. The setting of adjustable tap 62 may be made such that the potential of cathode 37 is approximately 64 volts negative with respect to bus 25, and therefore control electrode 41 is one volt negative with respect to cathode 37. Referring now to Fig. 3b, if the voltage between buses 25 and 27 decreases to 75 volts, for example, the potential of cathode 37 tends to decrease to approximately 60 volts negative with respect to bus 25, while the potential of control electrode 41 remains at the previous value of 65 volts negative with respect to bus 25. Therefore control electrode 41 becomes 5 volts negative with respect to cathode 37, while previously electrode 41 was only 1 volt negative with respect to cathode 37. Under this condition the current conducted by electron discharge device 36 and winding 16 tends to be decreased, causing the excitation of exciter 7 and the voltage of generator 1 to be increased.

It will be understood that the regulating action provided by electron discharge device 36 is obtained by variation of the potential of cathode 37 with respect to the potential of control electrode 41, the latter being substantially constant in potential due to the substantially constant potential drop across gaseous discharge device 32. The desired voltage characteristic of generator 1 is shown graphically by curve 69 in Fig. 4, wherein the output voltage of generator 1 is plotted as a function of the current supplied by generator 1 in charging storage battery 3. It will be noted that the generated voltage is maintained substantially constant over a considerable range of current values. However, when a value of current is reached, which for the particular generator employed is relatively high, it is desirable to reduce the generated voltage sharply to limit the generator output current, as indicated by curve 69.

The current limiting action of magnetron 24 is obtained by varying the effective resistance of the combination of diode elements of electron discharge devices 44 and 45 by action of a magnetic field thereon. If the effective resistance of discharge devices 44 and 45 is varied the voltage drop thereacross is likewise varied causing the potential of cathode 37 to be varied with respect to the potential of bus 25. The effect of increasing the ampere-turns in coil 48 surrounding discharge devices 44 and 45 is shown by curve 70 in Fig. 5 wherein the combined effective resistance of the series combination of the diodes of discharge devices 44 and 45 is plotted as a function of net-ampere-turns in coil 48. It will be noted from curve 70 that the diode resistance is substantially constant over a considerable range of ampere-turns and that a sharp increase in resistance is encountered at a relatively large value of ampere-turns corresponding to a relatively large generator current.

Such a characteristic is obtained through the use of a magnetron by action of a magnetic field on electrons traveling from the cathode to the anode in an electron discharge device. Under action of magnetic flux the electrons, which normally travel in a straight path, are deviated spirally from their normal course and at a relatively critical point the spiral paths are sufficiently sharp to cause a large proportion of the electrons to return to the cathode rather than reach the plate. A further increase in magnetic flux prevents additional electrons from reaching the plate and the current conducted by the discharge device diminishes greatly. The effect of such an increase in current may be conveniently considered as an increase in effective resistance of an electron discharge device and is so considered in the present discussion.

Windings 46 and 47 of magnetron 24 are provided with a fixed number of turns. A substantially constant number of ampere-turns is provided by winding 46 for a given setting of resistance 65, while the number ampere-turns provided by winding 47 is proportional to the current supplied by generator 1. The flow of current through winding 46 is such that the ampere-turns provided thereby are in opposition to the ampere-turns provided by winding 47. The function of winding 46 is to provide a convenient adjustment of the point of cut-in of the current limit action of magnetron 24. When the net value of ampere-turns of windings 46 and 47 causes the magnetic flux provided in the vicinity of discharge devices 44 and 45 to reach the cut-in value, the potential drop across devices 44 and 45 increases substantially causing the regulated voltage between buses 25 and 27 tends to be decreased to reduce the current supplied by generator 1.

Referring to Fig. 3c, there is shown a circuit arrangement similar to Figs. 3a and 3b wherein it is assumed that the current output of generator 1 is relatively large. Accordingly, the effective resistance of electron discharge devices 44 and 45 represented by resistance element 44' is substantially increased beyond the normal value thereof as represented in the examples of Figs. 3a and 3b. With an increase in the value of resistance 44' the disposition of voltage between buses 25 and 27 across resistances 44' and 66' is modified. More particularly, with an increase in the value of resistance 44' the voltage drop thereacross is proportionally greater with respect to the voltage between buses 25 and 27 than would normally be the case.

In Fig. 3c it is assumed that the voltage across resistance 44' is 70 volts and thus the potential of cathode 37 is 70 volts negative with respect to the potential of bus 25. However, as in the previous examples, the potential of control electrode 41 remains substantially constant at a value of 65 volts negative with respect to bus 25, thereby making the potential of control electrode 41 five volts positive with respect to the cathode 37. Under this condition the flow of current through electron discharge device 36 and winding 16 is increased causing a net decrease in the excitation of exciter 7 and a corresponding decrease in the voltage of generator 1, which is represented as being 75 volts. A decrease in the voltage of generator 1 results in a decrease in the current supplied by generator 1. The voltage of generator 1 is reduced sufficiently to limit the current thereof to a predetermined maximum value as indicated by curve 69 in Fig. 4.

It will be understood that hte current limiting action which is obtained through the use of magnetron 24 is in effect similar to the voltage regulating action previously described, in that the current flowing in electron discharge device 36 and winding 16 is controlled by varying the potential of cathode 37 with respect to the substantially constant potential of control electrode 41.

It will be noted that certain advantages are obtainable through the use of the current limiting arrangement of our invention in excitation systems of the type herein described. In particular, by the use of a magnetron device as a current responsive element, the voltage drop attributable to such an element may be made relatively low to minimize power losses therein. Furthermore in the magnetron device employed in the embodiment of our invention herein described, the flux provided by potential winding 46 is arranged to oppose the flux provided by current winding 47 in response to the current output of generator 1, causing a feed-back action due to changes of the voltage of generator 1 which is impressed on winding 46. The preence of such feed-back tends to provide a relatively sharp cut-in of the current limiting action of the regulating system.

The excitation characteristics obtainable through the use of our invention are particularly suitable for battery charging applications, although our invention is not limited to such applications. The absence of moving contacts and other mechanical devices, with the exception of a conventional reverse current relay, is particularly advantageous in reducing maintenance and troublesome operation to a minimum. In addition in battery charging applications all necessary operating and control voltages may be obtained from the battery itself without the use of auxiliary sources.

What we claim as new and desire to secure by Letters Patent of the United States is:

1. An excitation system for a dynamoelectric machine including a field exciting winding, dynamoelectric means arranged to energize said field exciting winding, control means including an electron discharge device having a cathode, an anode and a control electrode to vary the energization provided by said dynamoelectric means, means to maintain said control electrode at a potential substantially constant with respect to the potential of said anode, means responsive to the voltage output of said dynamoelectric machine to vary the potential of said cathode with respect to the potential of said control electrode, means including a magnetron device responsive to the current output of said dynamoelectric machine to vary the potential of said cathode with respect to the potential of said control electrode, said control means being arranged to maintain the polarity of said voltage output fixed relative to the output terminals of said dynamoelectric machine and in response to variation of said potential of said cathode to regulate said voltage output at a substantially constant value for values of said current output below a predetermined value and to decrease said voltage output for values of said current output above said predetermined value to limit said current ouput to a predetermined maximum value, said maximum value being adjustable over a substantial range.

2. An excitation system for a dynamoelectric machine including a field exciting winding; an auxiliary dynamoelectric machine connected to energize said field exciting winding; means for controlling the current in said winding in response to the voltage output of said dynamoelectric machine, said means comprising an electric motor to drive said auxiliary dynamoelectric machine and connected to be supplied with an output voltage from said dynamoelectric machine; a control field winding on said auxiliary dynamoelectric machine; and means controlling current in said control field winding to limit the current output of said dynamoelectric machine to a predetermined value, said last-mentioned means including a magnetron having a current winding connected in the output circuit of said dynamoelectric machine.

MARTIN A. EDWARDS.
DONALD E. GARR.
HUGH M. OGLE.

REFERENCES CITED

The following references are of record in the file of this patent:

UNITED STATES PATENTS

| Number | Name | Date |
|---|---|---|
| 1,875,043 | Leece et al. | Aug. 30, 1932 |
| 2,334,179 | Edwards et al. | Nov. 16, 1943 |
| 2,452,611 | Stratton | Nov. 2, 1948 |